US 12,524,228 B2

(12) United States Patent
Perry et al.

(10) Patent No.: US 12,524,228 B2
(45) Date of Patent: Jan. 13, 2026

(54) SYSTEM AND METHOD FOR SYNCHRONIZING SOFTWARE ON CLUSTERED STORAGE APPLIANCES

(71) Applicant: Dell Products L.P., Round Rock, TX (US)

(72) Inventors: Joseph A. Perry, Sutton, MA (US); Vasudevan Subramanian, Chapel Hill, NC (US); Dazhi Dong, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 179 days.

(21) Appl. No.: 18/464,339

(22) Filed: Sep. 11, 2023

(65) Prior Publication Data
US 2025/0085965 A1    Mar. 13, 2025

(51) Int. Cl.
*G06F 8/71*    (2018.01)
*G06F 8/65*    (2018.01)

(52) U.S. Cl.
CPC . *G06F 8/71* (2013.01); *G06F 8/65* (2013.01)

(58) Field of Classification Search
CPC .................................... G06F 8/71; G06F 8/65
See application file for complete search history.

(56) References Cited

U.S. PATENT DOCUMENTS

| 2005/0198312 A1* | 9/2005 | Ashwood-Smith ........................ H04L 41/0659 709/228 |
| 2010/0169446 A1* | 7/2010 | Linden ................ H04L 41/0894 709/224 |
| 2015/0213291 A1* | 7/2015 | Gut ...................... H01R 13/665 726/26 |
| 2019/0340059 A1* | 11/2019 | Bagarolo .................. G06F 8/71 |
| 2022/0256208 A1* | 8/2022 | Sadafal ................. G06F 3/0688 |
| 2023/0401072 A1* | 12/2023 | Rajamanickam ....... H04L 45/02 |
| 2024/0095018 A1* | 3/2024 | Pepke ....................... G06F 8/65 |

* cited by examiner

*Primary Examiner* — Jay A Morrison
(74) *Attorney, Agent, or Firm* — Brian J. Colandreo; Heath M. Sargeant; Holland & Knight LLP (57) ABSTRACT

A method, computer program product, and computing system for synchronizing system software between a new storage appliance and a storage cluster having one or more pre-existing appliances. The synchronization process includes: determining a software version used by the pre-existing storage appliances in the storage cluster, determining a software version used by the new storage appliance to be added to the storage cluster, and comparing the software version used by the pre-existing storage appliances to the software version used by the new storage appliance. Moreover, in response to determining that the software version used by the new storage appliance is more recent than the software version used by the pre-existing storage appliances, the synchronization process performs a hardware check on the new storage appliance for hardware compatibility with the software version used by the pre-existing storage appliances.

14 Claims, 5 Drawing Sheets

SYSTEM AND METHOD FOR SYNCHRONIZING SOFTWARE ON CLUSTERED STORAGE APPLIANCES

BACKGROUND

Embodiments disclosed herein relate generally to systems and methods for managing storage clusters. Adding a new storage appliance to a storage cluster is one of the easiest ways to increase storage capacity and server availability. Accordingly, various methodologies may be employed to streamline and simplify this process for customers.

Typically, customers require a specific version of software to govern the behavior of a vendor appliance when the appliance is used as a part of a storage cluster. When a customer purchases a new storage appliance, the software version shipping from the vendor may be different from the software version that is already being used by the appliances that are already included in a storage cluster. Accordingly, in some instances, the new storage appliance will have older software that needs to be upgraded to be in sync with the cluster, and in other instances, the new storage appliance will have newer software that needs to be downgraded to be in sync with the cluster. This issue is further complicated by constant improvements in hardware components used in vendor appliances. Newer appliances may include hardware components that are too advanced to be compatible with older versions of the software already being used on a cluster, in which case the newer appliance simply cannot be added to the cluster.

Presently, customers have to verify hardware compatibility and perform software upgrades/downgrades through their own non-standardized manual synchronization process. Manual synchronization is generally a time-consuming process that is prone to human error, which may cause unnecessary downtime or decreased availability on the cluster.

SUMMARY OF DISCLOSURE

In one example implementation, a method for synchronizing system software between a new storage appliance and a storage cluster having one or more pre-existing appliances. The method includes: determining a software version used by the one or more pre-existing storage appliances in the storage cluster, determining a software version used by the new storage appliance to be added to the storage cluster, and comparing the software version used by the one or more pre-existing storage appliances to the software version used by the new storage appliance. Additionally, in response to determining that the software version used by the new storage appliance is more recent than the software version used by the one or more pre-existing storage appliances, a hardware check is performed on the new storage appliance for hardware compatibility with the software version used by the one or more pre-existing storage appliances.

One or more of the following example features may be included. Determining the software version used by the one or more pre-existing storage appliances may include obtaining, at the new storage appliance, a hardware check table from the one or more pre-existing storage appliances. The hardware check table includes an entry for each hardware component installed in the new storage appliance. Each entry including: a name for the hardware component, the corresponding minimum software version required for successful software synchronization, and a detector function configured to detect the presence of the hardware component. Performing the hardware check by: determining hardware compatibility in the software version used by the new storage appliance, and downgrading the software version of the new storage appliance to the software version used by the one or more pre-existing storage appliances. Performing the hardware check may include: determining a lack of hardware compatibility in the software version used by the one or more pre-existing storage appliances, and reporting a synchronization failure in the software used by the one or more pre-existing storage appliances and the software used by the new storage appliance. The hardware check may be performed iteratively on each entry in the hardware check table from lowest to highest.

In another example implementation, a computer program product residing on a non-transitory computer-readable medium having a plurality of instructions stored thereon which, when executed by a processor, cause the processor to perform software synchronization operations that include: determining a software version used by one or more pre-existing storage appliances in a storage cluster, determining a software version used by a new storage appliance to be added to the storage cluster, and comparing the software version used by the one or more pre-existing storage appliances to the software version used by the new storage appliance. Additionally, in response to determining that the software version used by the new storage appliance is more recent than the software version used by the one or more pre-existing storage appliances, a hardware check is performed on the new storage appliance for hardware compatibility with the software version used by the one or more pre-existing storage appliances.

One or more of the following example features may be included. Determining the software version used by the one or more pre-existing storage appliances may include obtaining, at the new storage appliance, a hardware check table from the one or more pre-existing storage appliances. The hardware check table includes an entry for each hardware component installed in the new storage appliance. Each entry may include: a name for the hardware component, the corresponding minimum software version required for successful software synchronization, and/or a detector function configured to detect the presence of the hardware component. Performing the hardware check by: determining hardware compatibility in the software version used by the new storage appliance, and downgrading the software version of the new storage appliance to the software version used by the one or more pre-existing storage appliances. Performing the hardware check may include: determining a lack of hardware compatibility in the software version used by the one or more pre-existing storage appliances, and reporting a synchronization failure in the software used by the one or more pre-existing storage appliances and the software used by the new storage appliance, the hardware check may be performed iteratively on each entry in the hardware check table from lowest to highest. The synchronization process may be automatically performed when the new storage appliance is initially connected to the storage cluster.

In another example implementation, a system for performing a software synchronization process between a new storage appliance and a storage cluster having one or more pre-existing appliances. The system includes a system controller stored on the storage cluster. The system controller is configured to determine a software version used by the one or more pre-existing storage appliances in the storage cluster, determine a software version used by the new storage appliance to be added to the storage cluster, and compare the software version used by the one or more pre-existing storage appliances to the software version used by the new storage appliance. Additionally, in response to determining that the software version used by the new storage appliance is more recent than the software version used by the one or more pre-existing storage appliances, perform a hardware check on the new storage appliance for hardware compatibility with the software version used by the one or more pre-existing storage appliances.

One or more of the following example features may be included. Determining the software version used by the one or more pre-existing storage appliances may include obtaining, at the new storage appliance, a hardware check table from the one or more pre-existing storage appliances. The hardware check table includes an entry for each hardware component installed in the new storage appliance. Each entry may include: a name for the hardware component, the corresponding minimum software version required for successful software synchronization, and/or a detector function configured to detect the presence of the hardware component. Performing the hardware check by: determining hardware compatibility in the software version used by the new storage appliance, and downgrading the software version of the new storage appliance to the software version used by the one or more pre-existing storage appliances. Performing the hardware check by: determining a lack of hardware compatibility in the software version used by the one or more pre-existing storage appliances, and reporting a synchronization failure in the software used by the one or more pre-existing storage appliances and the software used by the new storage appliance. The hardware check may be performed iteratively on each entry in the hardware check table from lowest to highest. The software synchronization process may be performed automatically when the new storage appliance is initially connected to the storage cluster.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
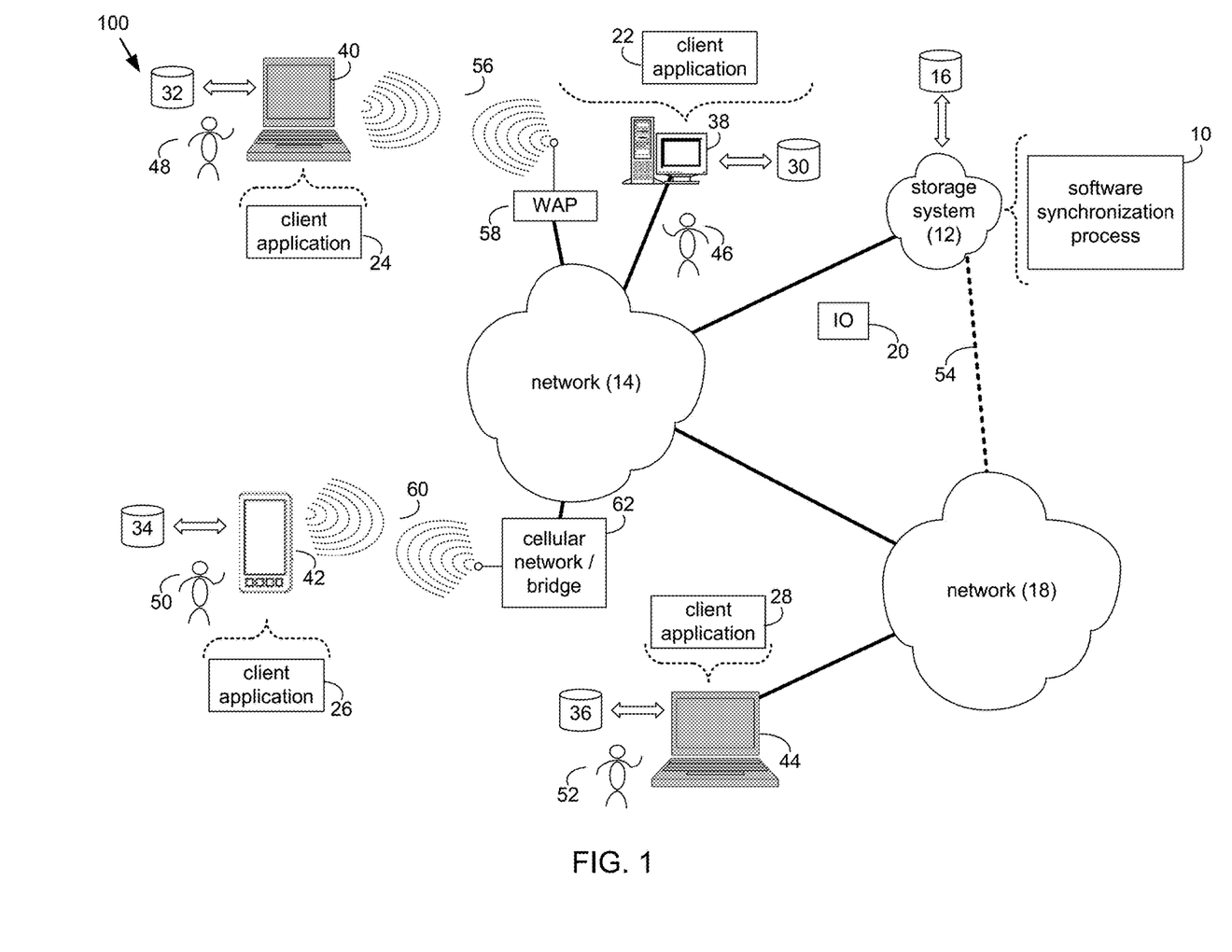
FIG. 1 is an example diagrammatic view of a storage system and a software synchronization process coupled to a distributed computing network according to one or more example implementations of the disclosure.

Referring to FIG. 1, there is shown software synchronization process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of software synchronization process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of software synchronization process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
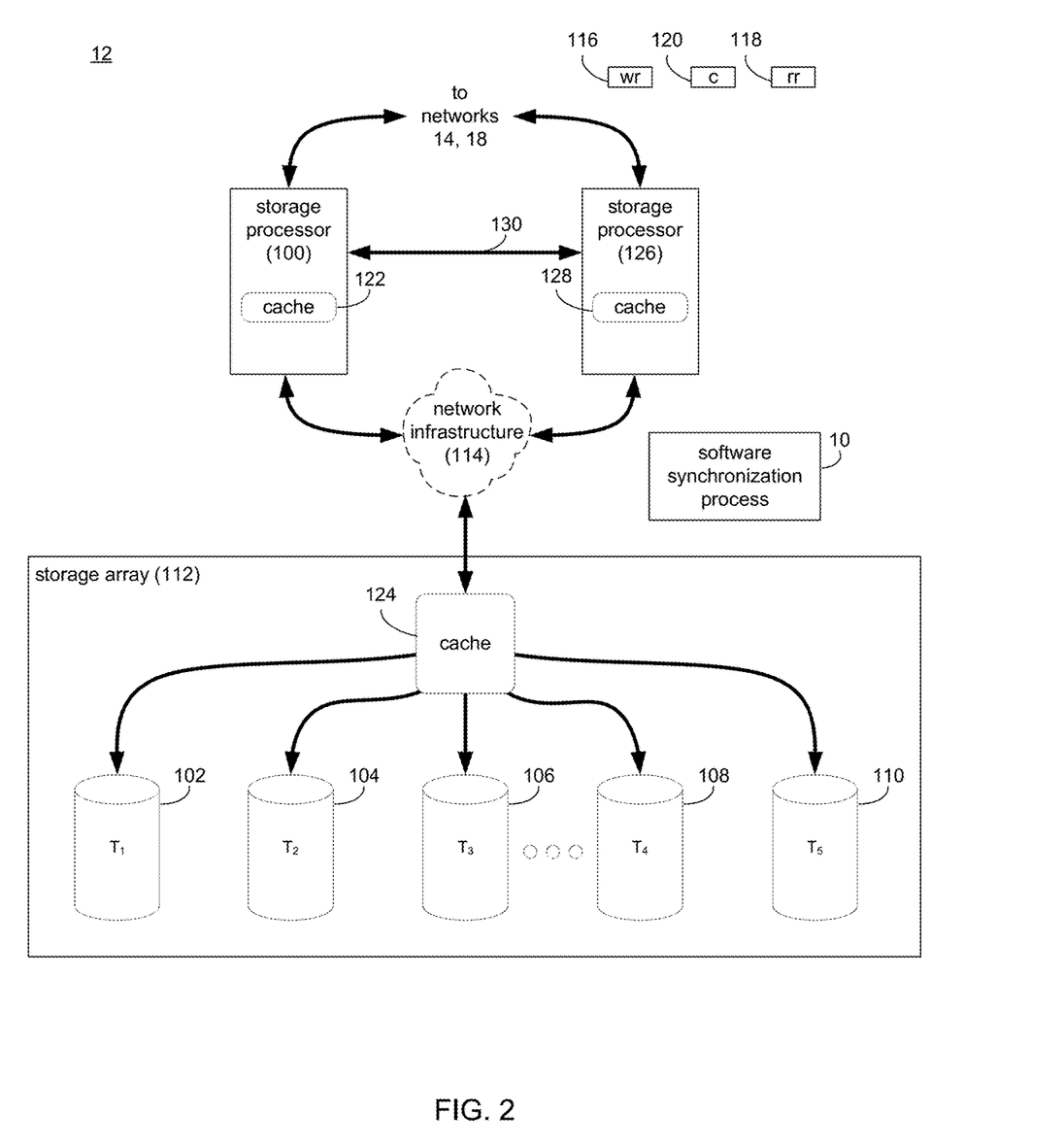
FIG. 2 is an example diagrammatic view of the storage system of FIG. 1 according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of software synchronization process 10. The instruction sets and subroutines of software synchronization process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of software synchronization process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of software synchronization process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of software synchronization process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

In some implementations, storage system 12 may include multi-node active/active storage clusters configured to provide high availability to a user. As is known in the art, the term "high availability" may generally refer to systems or components that are durable and likely to operate continuously without failure for a long time. For example, an active/active storage cluster may be made up of at least two nodes (e.g., storage processors 100, 126), both actively running the same kind of service(s) simultaneously. One purpose of an active-active cluster may be to achieve load balancing. Load balancing may distribute workloads across all nodes in order to prevent any single node from getting overloaded. Because there are more nodes available to serve, there will also be a marked improvement in throughput and response times. Another purpose of an active-active cluster may be to provide at least one active node in the event that one of the nodes in the active-active cluster fails.

In some implementations, storage processor 126 may function like storage processor 100. For example, during operation of storage processor 126, content 118 to be written to storage system 12 may be processed by storage processor 126. Additionally/alternatively and when storage processor 126 is configured as an application server, content 118 to be written to storage system 12 may be internally generated by storage processor 126.

Storage processor 126 may include frontend cache memory system 128. Examples of frontend cache memory system 128 may include but are not limited to a volatile, solid-state, cache memory system (e.g., a dynamic RAM cache memory system) and/or a non-volatile, solid-state, cache memory system (e.g., a flash-based, cache memory system).

Storage processor 126 may initially store content 118 within frontend cache memory system 126. Depending upon the manner in which frontend cache memory system 128 is configured, storage processor 126 may immediately write content 118 to data array 112 (if frontend cache memory system 128 is configured as a write-through cache) or may subsequently write content 118 to data array 112 (if frontend cache memory system 128 is configured as a write-back cache).

In some implementations, the instruction sets and subroutines of software synchronization process 10, which may be stored on storage device 16 included within storage system 12, may be executed by one or more processors (not shown) and one or more memory architectures (not shown) included within storage system 12. Accordingly, in addition to being executed on storage processor 126, some or all of the instruction sets and subroutines of software synchronization process 10 may be executed by one or more processors (not shown) and one or more memory architectures (not shown) included within data array 112.

Further and as discussed above, during the operation of data array 112, content (e.g., content 118) to be written to data array 112 may be received from storage processor 126 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

As discussed above, storage processor 100 and storage processor 126 may be configured in an active/active configuration where processing of data by one storage processor may be synchronized to the other storage processor. For example, data may be synchronized between each storage processor via a separate link or connection (e.g., connection 130).

Figure 3:
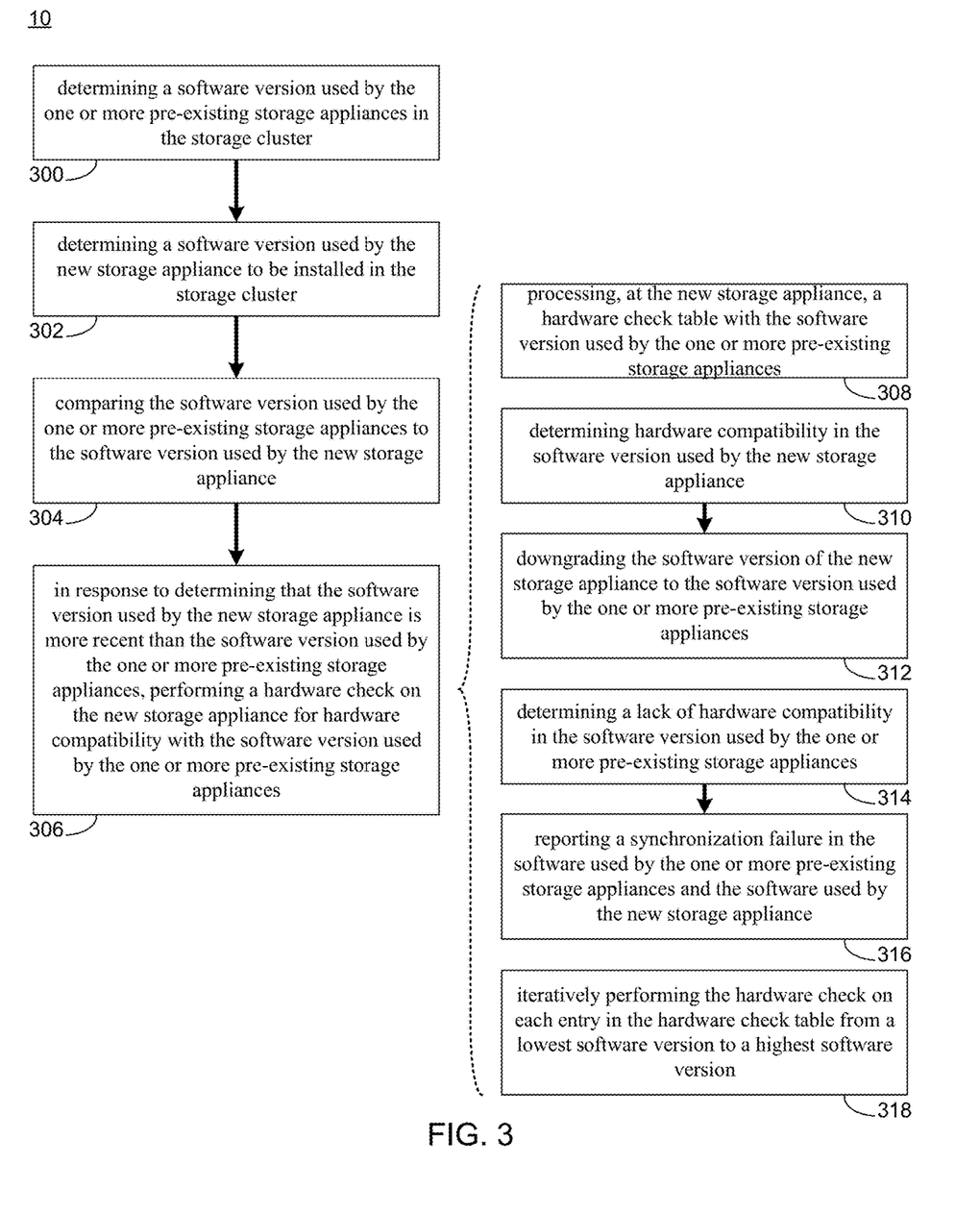
FIG. 3 is an example flowchart of a software synchronization process according to one or more example implementations of the disclosure.
Figure 4:
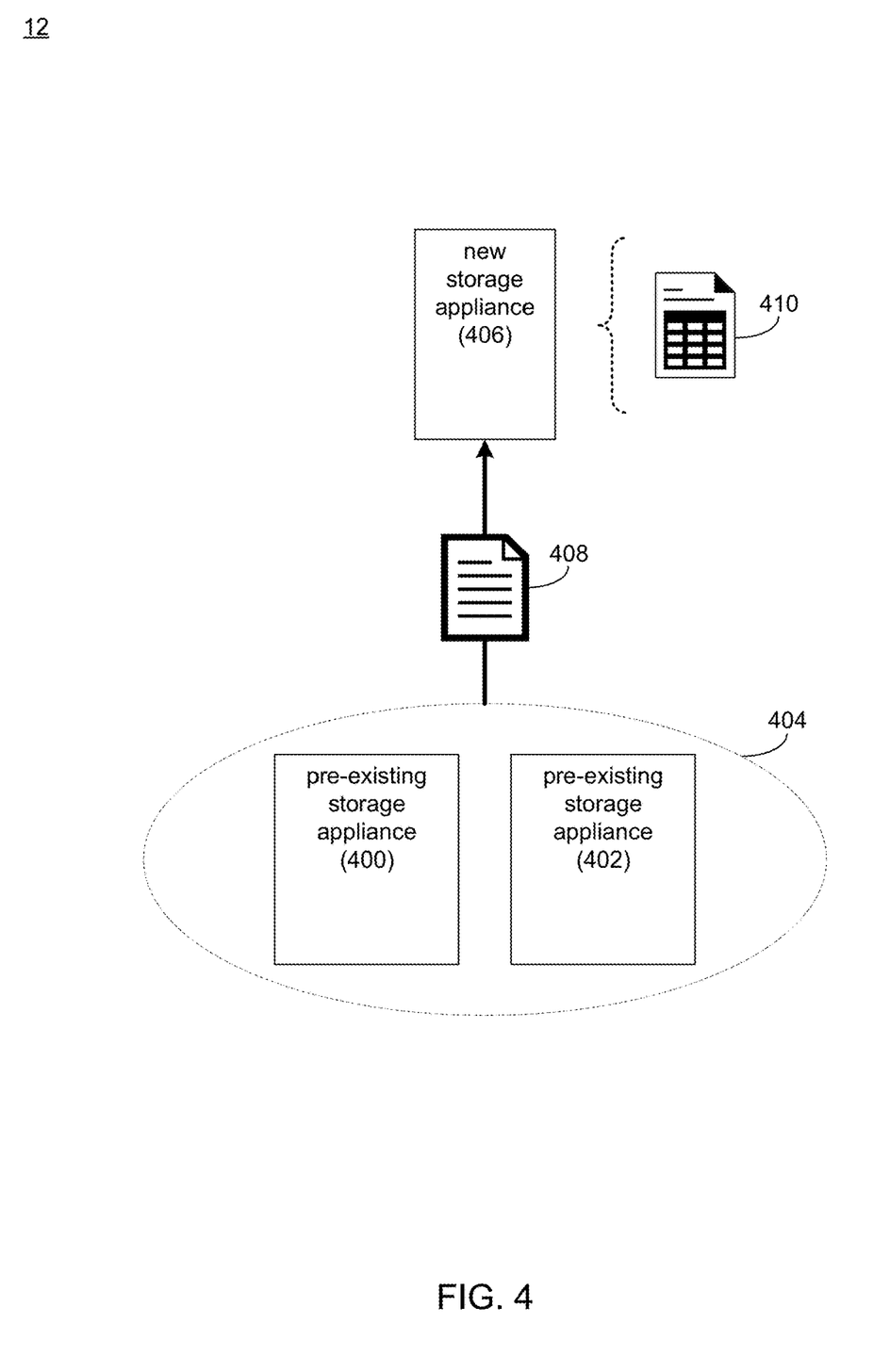
FIG. 4 is an example diagrammatic view illustrating implementation of the software synchronization process of FIG. 3.
Figure 5:
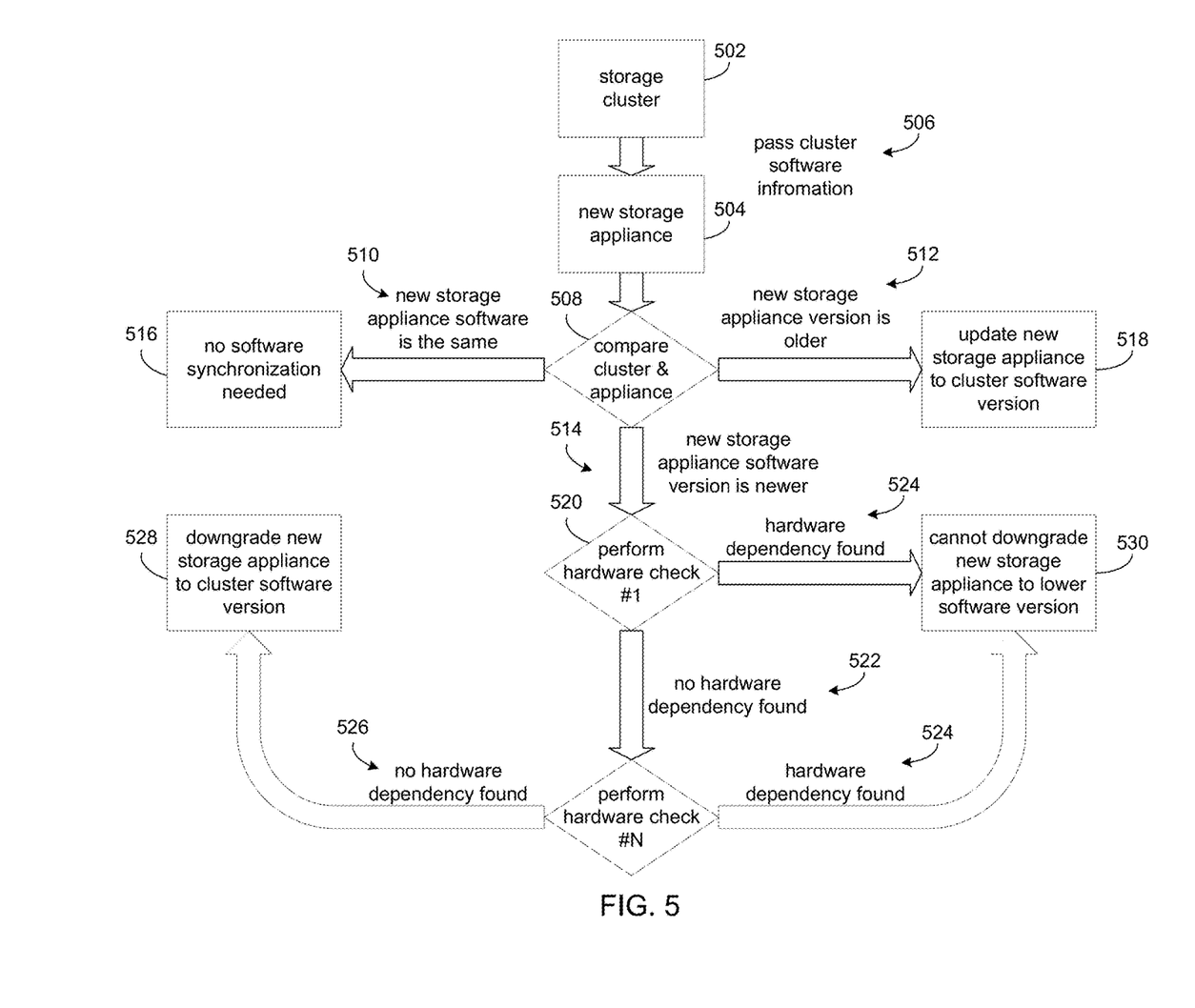
FIG. 5 is an example diagrammatic view of the software synchronization process of FIG. 3 according to one or more example implementations of the disclosure.

The Software Synchronization Process:

Referring also to FIGS. 3-5 and in some implementations, software synchronization process 10 may determine 300 a software version used by one or more pre-existing storage appliances in a storage cluster, and may determine 302 a software version used by a new storage appliance to be added to the storage cluster. The software version used by the one or more pre-existing storage appliances is compared 304 to the software version used by the new storage appliance. In response to determining that the software version used by the new storage appliance is more recent than the software version used by the one or more pre-existing storage appliances, a hardware check is performed 306 on the new storage appliance for hardware compatibility with the software version used by the one or more pre-existing storage appliances 400.

Storage cluster customers typically require a specific version of software to be used on a vendor's storage appliances. When a customer purchases a new storage appliance, the software version shipping from the vendor may be different from the software version currently in use on the cluster. What follows is a discussion of an automated system and method for synchronizing system software when a new storage appliance is to be added to a pre-existing storage cluster.

In some implementations, software synchronization process 10 determines 300 a software version used by the one or more pre-existing storage appliances in the storage cluster. Referring also to FIG. 4, one or more pre-existing storage appliances (e.g., pre-existing storage appliances 400, 402) are included in a storage cluster (e.g., storage cluster 404). While FIG. 4 shows two pre-existing storage appliances in storage cluster 404, it will be appreciated that this is for example purposes only and that any number of pre-existing storage appliances may be included within a storage cluster within the scope of the present disclosure. In some implementations, pre-existing storage appliances 400, 402 may each already be running the same software version. Software synchronization process 10 may determine 300 a software version used by the pre-existing storage appliances by querying any of the pre-existing storage appliances 400, 402 for software version information. In some implementations, whenever a new storage appliance (e.g., new storage appliance 406) is connected to storage cluster 404, software synchronization process 10 may automatically query both new storage appliance 406 and pre-existing storage appliance 400 and/or pre-existing storage appliance 402 for software version information as a part of determining 300, 302 the software versions are being used.

In some implementations, software synchronization process 10 may determine 302 a software version used by the new storage appliance to be added to the storage cluster. For example, a new storage appliance (e.g., new storage appliance 406) may be added as a candidate storage appliance for storage cluster 404. In one example, new storage appliance 406 may be selected from a plurality of candidate storage appliances to add to storage cluster 404. In another example, storage appliance 406 may be physically or communicatively coupled (e.g., via a physical or virtual network connection) to storage cluster 404. In this example, a software version of a particular portion of software being used by new storage appliance 406 may be unknown to storage cluster 404 and the software version already installed on pre-existing storage appliances 400, 402 may be unknown to new storage appliance 406. Accordingly and as will be described in greater detail below, software synchronization process 10 may instruct a pre-existing storage appliance (e.g., pre-existing storage appliance 400, 402) to send its own software version information to new storage appliance 404. For example, pre-existing storage appliance 400 or pre-existing storage appliance 402 may transmit software version information (e.g., software version information 408) with a listing of software versions used for each portion of software being used by pre-existing storage appliance 400 and/or pre-existing storage appliance 402.

In some implementations, software synchronization process 10 may compare 304 the software version used by the one or more pre-existing storage appliances to the software version used by the new storage appliance. For example, software synchronization process 10 may compare the software version used by the one or more pre-existing storage appliances to the software version used by the new storage appliance to determine whether the software version used by the pre-existing storage appliance(s) is older than the software version used by the new storage appliance, whether the software version used by the pre-existing storage appliance (s) is the same as the software version used by the new storage appliance, or whether the software version used by the pre-existing storage appliance(s) is newer than the software version used by the new storage appliance. For example, software version information for each storage appliance may be a alphanumerical identifier where the greater the value of the alphanumerical identifier value, the more recent or "newer" the software version. By contrast, the smaller the value of the alphanumerical identifier value, the "older" the software version.

In some implementations and in response to determining that the software version used by the new storage appliance is more recent than the software version used by the one or more pre-existing storage appliances, software synchronization process 10 may perform 306 a hardware check on the new storage appliance for hardware compatibility with the software version used by the one or more pre-existing storage appliances. For example, in the event that new storage appliance 406 includes a newer software version than pre-existing storage appliances 400, 402 of storage cluster 404, the most practical way to synchronize software versions between pre-existing storage appliances 400, 402 and new storage appliance 406 may be to rollback the software version used by new storage appliance 404 to the older version used by pre-existing storage appliances 400, 402 of storage cluster 404. Accordingly, software synchronization process 10 may perform 306 a hardware check to determine compatibility between new storage appliance 406 and the older software version used by pre-existing storage appliances 400, 402 of storage cluster 404. The rapid rate of technological development introduces possible incompatibility issues between hardware components installed on new storage appliance 404 and the storage software version being used on storage cluster 402. For example, an older software version (e.g., version "X") may require a storage appliance to use network interface cards capable of transmitting a maximum of 100 megabits per second (Mbps) and a new network card (NIC 2.0) may have a minimum transmission rate of 200 megabytes-per-second (Mbps). In this example, suppose that version "X" of the software cannot be used on a storage appliance with NIC 2.0 installed. Accordingly, software synchronization process 10 may perform 306 a hardware check to determine whether the hardware components of new storage appliance 404 is compatible with the older version of the software being used by pre-existing storage appliances 400, 402.

In some implementations, performing 306 the hardware check includes processing 308, at the new storage appliance, a hardware check table with the software version used by the one or more pre-existing storage appliances. A hardware check table (e.g., hardware check table 410) may include an entry for each hardware component installed in new storage appliance 406, with each entry including: a name for the hardware component, the corresponding minimum software version required for successful software synchronization, and a detector function configured to detect the presence of the hardware component. For example, the detector function may include a predefined process or script that is configured to detect whether a particular hardware component is installed in new storage appliance 406. An example of hardware check table 410 is shown below in Table 1:

TABLE 1

| Hardware Component | Earliest Software Version | Function Name |
| --- | --- | --- |
| Riptide_Depop | '3.2.0.0' | rt_depop_check |
| QLC_3200Q | '3.5.0.0' | qlc_3200q_system_check |
| QLC_5200Q | '3.5.8.0' | qlc_5200q_system_check |
| Riptide_COS | '3.7.1.3' | rt_cos_check |
| WK_COS | '3.9.4.6' | wk_cos_check |
| Broadcom_Card | '4.0.0.0' | broadcom_card_check |

As shown above in Table 1, for six hardware components, an earliest software version that is compatible with each hardware component is shown. In some implementations, software synchronization process 10 may compare the software version used by pre-existing storage appliances 400, 402 to the earliest software version supported by each hardware component within new storage appliance 406.

In some implementations, performing 306 the hardware check includes: determining 310 hardware compatibility in the software version used by the new storage appliance; and downgrading 312 the software version of the new storage appliance to the software version used by the one or more pre-existing storage appliances. For example, suppose pre-existing storage appliances 400, 402 of storage cluster 404 are running a software version that is more recent than the value shown in the 'earliest software version' column of hardware check table 410. Now suppose that software synchronization process 10 detects the corresponding hardware component in new storage appliance 406. In this example, software synchronization process 10 may determine 310 hardware compatibility in the software version used by new storage appliance 406 and may downgrade or roll back the software version of new storage appliance 406 to the same software version used by pre-existing storage appliances 400, 402. In this manner, software synchronization process 10 synchronizes software versions among new storage appliance 406 and pre-existing storage appliance 400, 402 by downgrading 312 the software version being used by new storage appliance 406.

In some implementations, performing 306 the hardware check includes: determining 314 a lack of hardware compatibility in the software version used by the pre-existing storage appliance; and reporting 316 a synchronization failure in the software used by the one or more pre-existing storage appliances and the software used by the new storage appliance. For example, suppose pre-existing storage appliances 400, 402 of storage cluster 404 are running a software version less than the value shown in the 'earliest software version' column of hardware check table 410. Now suppose that software synchronization process 10 detects the corresponding hardware component. In this example, software synchronization process 10 determines 314 a lack of hardware compatibility in the software version used by pre-existing storage appliance 406. Software synchronization process 10 may report 316 or return a synchronization failure to storage cluster 404. In response to a synchronization failure notification, software synchronization process 10 may deny the request to add new storage appliance 406 to storage cluster 404. In some implementations, the synchronization failure notification may include information concerning the synchronization failure including the hardware component of the new storage appliance and the software version used by the storage cluster that create the lack of hardware compatibility. In some implementations, software synchronization process 10 may provide a user an option to override or disable certain hardware components in new storage appliance 406 and/or certain software in storage cluster 404.

In some implementations, performing 306 the hardware check may include iteratively performing 318 the hardware check on each entry in the hardware check table from a lowest software version to a highest software version. For example, processing 308 the hardware check table may include returning the earliest software version as the minimum software version required. By ordering hardware check table 410 based on the earliest software version information, and performing the checks in that order, software synchronization process 10 may detect a failure condition without needing to check compatibility for every hardware component included in hardware check table 410. For example, if software synchronization process 10 detects the presence of QLC_3200Q, there would be no need to continue checks for each of the remaining hardware components, and the failure notification would specify that storage appliance would need to have at least software version 3.5.0.0 installed in order to synchronize with storage cluster 402.

Referring now to FIG. 5, a synchronization system 500 includes a pre-existing storage cluster 502 and a new storage appliance 504. Storage cluster 502 is comprised of one or more storage appliances, all of which are already running the same software version, and are therefore already synchronized with one another. Initially, the version of the software being used by new storage appliance 504 is unknown. Storage cluster 502 passes 506 its own software version information over to new storage appliance 504, to perform a comparison 508 between the software on storage cluster 502 and the software on new storage appliance 504.

Comparison 508 yields one of three results. In the first possible result 510, the software versions are the same, in the second possible result 512, storage cluster 502 has a more updated software version than storage appliance 404, and in the third possible result 514, storage appliance 504 has a more updated software version than storage cluster 502. If result 510 occurs, then the software versions are the same, meaning storage cluster 502 and storage appliance 504 are already synchronized and no further action 516 is required. If result 512 occurs, then storage cluster 502 is running a newer software version than new storage appliance 504 and the software version currently installed on new storage appliance 504 will need to be upgraded 518 before synchronization can occur. If result 514 occurs, then storage appliance 504 is running a newer software version than storage cluster 502 and a hardware check 520 will need to be performed before synchronization can occur.

In some implementations, in response to result 514 where the software version used by the new storage appliance 504 is more recent than the software version used by the one or more pre-existing storage appliances on storage cluster 502, software synchronization process 10 performs 306 (see FIG. 3) a hardware check 520 on the new storage appliance 504 for hardware compatibility with the software version used by the one or more pre-existing storage appliances. Hardware check 520 yields one of two results. In the first case 522 no hardware dependencies are found and further hardware checks are performed, and in the second case 524 one or more hardware dependencies are found.

In some implementations, performing 306 hardware check 520 includes determining 526 hardware compatibility in the software version used by new storage appliance 504 for any hardware components of new storage appliance 504 and downgrading 528 the software version of the new storage appliance to the software version used by the one or more pre-existing storage appliances. This corresponds to result 526 occurring, which means that the hardware components (not shown) of storage appliance 504 do not create any unsupported hardware dependency issues. The minimum software version requirement is either equal to or lesser than the software version currently running on storage cluster 502. Therefore the software version installed on storage appliance 504 can be rolled back 528 to synchronize with the older software version currently running on storage cluster 502.

In some implementations, performing 306 hardware check 520 includes determining 524 a lack of hardware compatibility in the software version used by new storage appliance 504 and reporting 530 a synchronization failure between storage cluster 502 and new storage appliance 504. This corresponds to result 524 occurring, which means that the hardware components (not shown) of storage appliance 504 create at least one unsupported hardware dependency issue. The minimum software version requirement is greater than the software version currently running on storage cluster 502. As such, no further action 530 is possible, because storage appliance 504 cannot be synchronized with storage cluster 502.

To further clarify, consider the following use cases. First, suppose storage cluster 502 is running software version 3.0 and that storage appliance 504 is running software version 3.2. However, storage appliance 504 includes a "riptide depop node", which is a hardware component that requires storage appliance 504 to run a minimum software version of 3.2. In this case, software synchronization process 10 will detect that storage cluster 502 is running a lower software version than storage appliance 504. As such, comparison 508 will trigger hardware check 520 which in turn will detect that the "riptide depop node" is present in the appliance. Hardware check 520 will then detect that software version 3.2 is required and will return a failure notification because the minimum software requirements have not been satisfied and software synchronization is not supported in this case. For the final result, the appliance software will be left at the current version.

In another example, suppose storage cluster 502 is running software version 3.5 and that storage appliance 504 is running software version 4.0. Further suppose that storage appliance 504 includes the same hardware configuration as storage cluster 502. In this case, software synchronization process 10 may detect that storage cluster 502 is running a lower software version than storage appliance 504. Once again, comparison 508 may trigger hardware check 520 which in turn will determine that no hardware dependencies were found. Hardware check 520 may return a success notification because software synchronization is supported in this case and storage cluster 502 may initiate a factory initialization on new storage appliance 504 to install version 3.5.

In some implementations, the software version may be defined as a tuple consisting of (Major Version, Minor Version, Maintenance version, and HotFix version), and the level of specificity of comparison may be defined by the customer. For example, a first customer may require storage cluster 404 and new storage appliance 406 to be on the same maintenance version of the software, and a second customer may only care that storage cluster 404 and new storage appliance 406 be on the same major version. In that case, assuming storage cluster 404 is running software version (4.1.5.3) and new storage appliance 406 is running software version (4.1.4.9) the first customer would require new storage appliance 406 to undergo a software update, while the second customer would require no further action to be taken.

In some implementations, software synchronization process 10 may be run automatically without user intervention. Previously, customers could potentially run multiple software versions in the storage cluster and require quality analysis test teams to test many combinations of mixed versions in the cluster or customer usage would detect cluster incompatibility not detected earlier in testing. Additionally, customers could manually downgrade the version and introduce problems to the appliance, like new hardware not being fully supported. Without software synchronization process 10, customers would need to analyze the new storage appliance for differences with cluster appliances and manually compare release notes of the different software versions.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method for synchronizing system software between a new storage appliance and a storage cluster having one or more pre-existing appliances, executed on a computing device, comprising:
  determining a software version used by the one or more pre-existing storage appliances in the storage cluster;
  determining a software version used by the new storage appliance to be added to the storage cluster;
  comparing the software version used by the one or more pre-existing storage appliances to the software version used by the new storage appliance; and
  in response to determining that the software version used by the new storage appliance is more recent than the software version used by the one or more pre-existing storage appliances, performing a hardware check on the new storage appliance for hardware compatibility with the software version used by the one or more pre-existing storage appliances, wherein performing the hardware check includes:

processing, at the new storage appliance, a hardware check table with the software version used by the one or more pre-existing storage appliances, and iteratively performing the hardware check on each entry in the hardware check table from a lowest software version to a highest software version by ordering each pre-existing storage appliance within the hardware check table based on a lowest software version.

2. The computer-implemented method of claim 1, wherein the hardware check table includes an entry for each hardware component installed in the new storage appliance, each entry including: a name for the hardware component, the corresponding minimum software version required for successful software synchronization, and a detector function configured to detect the presence of the hardware component.

3. The computer-implemented method of claim 1, wherein performing the hardware check includes:

determining hardware compatibility in the software version used by the new storage appliance; and downgrading the software version of the new storage appliance to the software version used by the one or more pre-existing storage appliances.

4. The computer-implemented method of claim 1, wherein performing the hardware check includes:

determining a lack of hardware compatibility in the software version used by the one or more pre-existing storage appliances; and reporting a synchronization failure in the software used by the one or more pre-existing storage appliances and the software used by the new storage appliance.

5. A computer program product residing on a non-transitory computer-readable medium having a plurality of instructions stored thereon which, when executed by a processor, cause the processor to perform software synchronization operations comprising:

determining a software version used by one or more pre-existing storage appliances in a storage cluster;

determining a software version used by a new storage appliance to be added to the storage cluster;

comparing the software version used by the one or more pre-existing storage appliances to the software version used by the new storage appliance; and in response to determining that the software version used by the new storage appliance is more recent than the software version used by the one or more pre-existing storage appliances, performing a hardware check on the new storage appliance for hardware compatibility with the software version used by the one or more pre-existing storage appliances, wherein performing the hardware check includes:

processing, at the new storage appliance, a hardware check table with the software version used by the one or more pre-existing storage appliances, and iteratively performing the hardware check on each entry in the hardware check table from a lowest software version to a highest software version by ordering each pre-existing storage appliance within the hardware check table based on a lowest software version.

6. The computer program product of claim 5, wherein the hardware check table includes an entry for each hardware component installed in the new storage appliance, each entry including: a name for the hardware component, the corresponding minimum software version required for successful software synchronization, and a detector function configured to detect the presence of the hardware component.

7. The computer program product of claim 5, wherein performing the hardware check includes:

determining hardware compatibility in the software version used by the new storage appliance; and downgrading the software version of the new storage appliance to the software version used by the one or more pre-existing storage appliances.

8. The computer program product of claim 5, wherein performing the hardware check includes:

determining a lack of hardware compatibility in the software version used by the one or more pre-existing storage appliances; and reporting a synchronization failure in the software used by the one or more pre-existing storage appliances and the software used by the new storage appliance.

9. The computer program product of claim 5, wherein the processor is configured to automatically determine the software version used by the new storage appliance when the new storage appliance is initially connected to the storage cluster.

10. A computing system for performing a software synchronization process between a new storage appliance and a storage cluster having one or more pre-existing appliances, comprising:

a memory; and a processor configured to determine a software version used by one or more pre-existing storage appliances in a storage cluster, to determine a software version used by a new storage appliance to be added to the storage cluster, to compare the software version used by the one or more pre-existing storage appliances to the software version used by the new storage appliance, and in response to determining that the software version used by the new storage appliance is more recent than the software version used by the one or more pre-existing storage appliances, to perform a hardware check on the new storage appliance for hardware compatibility with the software version used by the one or more pre-existing storage appliances, wherein performing the hardware check includes: processing, at the new storage appliance, a hardware check table with the software version used by the one or more pre-existing storage appliances, and iteratively performing the hardware check on each entry in the hardware check table from a lowest software version to a highest software version by ordering each pre-existing storage appliance within the hardware check table based on a lowest software version.

11. The computing system of claim 10, wherein the hardware check table includes an entry for each hardware component installed in the new storage appliance, each entry including: a name for the hardware component, the corresponding minimum software version required for successful software synchronization, and a detector function configured to detect the presence of the hardware component.

12. The computing system of claim 10, wherein performing the hardware check includes:

determining hardware compatibility in the software version used by the new storage appliance; and downgrading the software version of the new storage appliance to the software version used by the one or more pre-existing storage appliances.

13. The computing system of claim 10, wherein performing the hardware check includes:

determining a lack of hardware compatibility in the software version used by the one or more pre-existing storage appliances; and reporting a synchronization failure in the software used by the one or more pre-existing storage appliances and the software used by the new storage appliance.

14. The computing system of claim 10, wherein the processor is further configured to:

automatically determine the software version used by the new storage appliance when the new storage appliance is initially connected to the storage cluster.

* * * * *